(12) United States Patent
Hershey et al.

(10) Patent No.: US 6,473,677 B1
(45) Date of Patent: Oct. 29, 2002

(54) METHOD AND APPARATUS FOR DETERMINING AN EFFECTIVE JET ENGINE MAINTENANCE SCHEDULE

(75) Inventors: John Erik Hershey, Ballston Lake, NY (US); John Frederick Ackerman, Laramie, WY (US); Vijay Kumar Millikarjun Hanagandi, Evansville, IN (US); Amy Victoria Aragones, Clifton Park, NY (US); Brock Estel Osborn, Niskayuna, NY (US); Nicolas Wadih Chbat, Albany, NY (US); Richard August Korkosz, Southwick, MA (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/882,681

(22) Filed: Jun. 18, 2001

(51) Int. Cl.$^7$ ............................................. G06F 15/00
(52) U.S. Cl. ........................... 701/30; 701/35; 701/29; 340/945; 340/601
(58) Field of Search ........................... 701/29, 30, 33, 701/35; 340/945, 601, 602, 516; 714/25; 702/184

(56) References Cited

U.S. PATENT DOCUMENTS 4,729,102 A * 3/1988 Miller et al. ................. 360/5
4,787,053 A * 11/1988 Moore ........................ 340/945
5,018,069 A * 5/1991 Pettigrew ..................... 701/35
5,552,987 A * 9/1996 Barger et al. ............... 340/971
6,148,179 A * 11/2000 Wright et al. .............. 340/531
6,160,998 A * 12/2000 Wright et al. .......... 340/825.72
6,182,048 B1   1/2001 Osborn et al.

FOREIGN PATENT DOCUMENTS

GB        2345343 A  *  7/2000  .......... G05D/23/02

* cited by examiner

Primary Examiner—Yonel Beaulieu
Assistant Examiner—Eric M. Gibson
(74) Attorney, Agent, or Firm—John F. Thompson; Jill M. Breedlove

(57) ABSTRACT

A system for determining a maintenance schedule for a jet engine using at least remotely-gathered environmental data is provided. The system includes a remote monitor having a sensor for collecting the remotely-gathered environmental data. A data pathway is connected to the remote monitor. A processor is connected to the data pathway and processes the remotely-gathered environmental data collected by the remote monitor. An environmental database is connected to the data pathway and compiles and stores the remotely-gathered environmental data. A flight database is connected to the data pathway and compiles and stores flight data for the jet engine. The flight data includes at least thermal cycle data and time on wing data. The processor is adapted to generate the maintenance schedule for the jet engine based on the correlation of the remotely-gathered environmental data and the flight data.

57 Claims, 6 Drawing Sheets

METHOD AND APPARATUS FOR DETERMINING AN EFFECTIVE JET ENGINE MAINTENANCE SCHEDULE

BACKGROUND OF THE INVENTION

The present invention relates generally to engine maintenance, and more particularly to a method and system for assessing jet engine cycles based upon local gathering and analysis of environmental data for the purpose of determining an jet engine maintenance schedule based upon the environmental data.

Jet engine turbines require periodic maintenance. It is critical that this maintenance be performed at appropriate times during the life cycle of the jet engine. Currently, jet engine maintenance schedules are based upon jet engine "thermal" cycles and the amount of time the jet engine is in the air ("time on wing"). A jet engine "thermal" cycle refers to the full heating and then cooling that a jet engine undergoes during take-off, climb, cruise, descent and landing. These cycles are logged for each jet engine. A flight leg is a common time average measure used in Maintenance Cost Per Hour (MCPH) service contracts and is defined as the time on wing divided by the number of cycles.

Many conditions relating to each cycle affect the wear introduced to the jet engine. These conditions include, for example, engine derate and environmental factors. Engine derate refers to the running of a jet engine at less than its rated power output. Jet engines are often derated to prolong jet engine life and minimize necessary maintenance. Environmental factors include, for example, ambient air temperature, atmospheric pressure, relative humidity, airborne particulates, and the pH of precipitation.

At present, jet engine maintenance contracts specify schedules based only upon flight hours and engine cycles. The suggested maintenance occurs according to these schedules. In addition, maintenance can occur when necessary due to a mechanical event, or as indicated by changes in the monitored engine exhaust gas temperature. Typically, environmental factors are not considered when a jet engine maintenance schedule is determined.

Therefore, a desire exists to understand effects of environmental factors on engine life and required maintenance such that a maintenance schedule for a jet engine can be determined that is also based on the effects that the environmental data has on wear of the jet engine.

BRIEF SUMMARY OF THE INVENTION

In one representative embodiment, a system for determining a maintenance schedule for a jet engine using at least remotely-gathered environmental data is provided. The system comprises a remote monitor for collecting and transmitting the remotely-gathered environmental data and a processing unit for receiving the remotely-gathered data from the remote monitor and determining a maintenance schedule for the jet engine. The remote monitor comprises at least one sensor for measuring the remotely-gathered environmental data. A controller is connected to the at least one sensor. A remote communications device is connected to the controller for transmitting the remotely-gathered data. The processing unit comprises a processor communications device for receiving the remotely-gathered data transmitted from the remote monitor. A processor is connected to the processor communications device for processing the remotely-gathered environmental data. An environmental database is connected to the processor for compiling and storing the remotely-gathered environmental data. A flight database is connected to the processor for compiling and storing flight data for the jet engine. The flight data includes at least thermal cycle data and time on wing data. The processor is adapted to generate a maintenance schedule for the jet engine based on the remotely-gathered environmental data and the flight data.

In another representative embodiment, a method of determining a maintenance schedule for a jet engine is provided. The method comprises the steps of providing flight pattern data for the jet engine. The flight pattern data includes a take-off location for the jet engine, a landing location for the jet engine, thermal cycle data for the jet engine and time on wing data for the jet engine. Environmental data is measured proximate to the take-off location for the jet engine. In addition, environmental data is measured proximate to the landing location for the jet engine. The measured environmental data from the take-off location and the landing location are correlated to wear and/or erosion of the jet engine. The maintenance schedule for the jet engine is determined based upon correlation of the environmental data to the wear and/or erosion of the jet engine and using the thermal cycle data and the time on wing data.

DETAILED DESCRIPTION OF THE INVENTION

Figure 1:
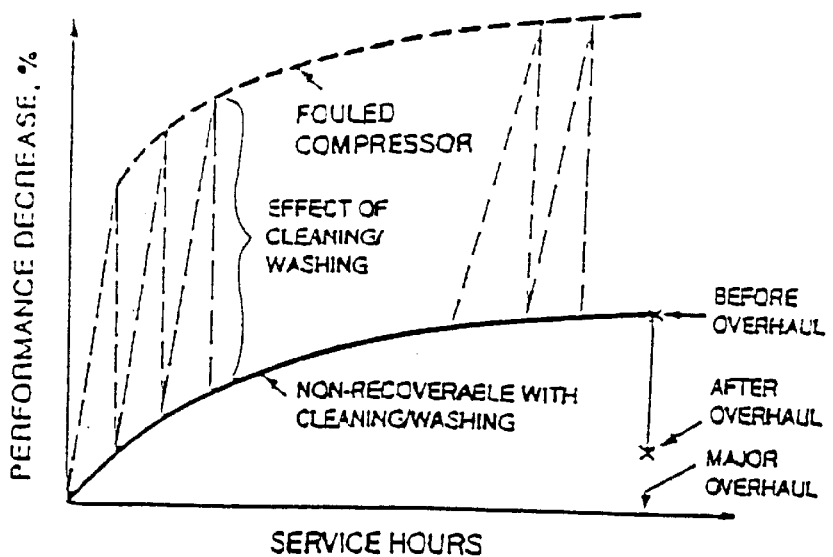
FIG. 1 (PRIOR ART) is a prior art illustration of a typical performance deterioration of a jet engine compressor.

Several types of deterioration cause jet engines and gas turbine engines to degrade over time. As shown in FIG. 1 (PRIOR ART), in relation to a compressor used in a jet engine, performance deterioration can be recoverable by cleaning/washing. However, some performance deterioration is not recoverable with cleaning/washing. In addition, even after an overhaul or refurbishment of the component, permanent performance deterioration results over time. As shown in FIG. 1 (PRIOR ART), a maintenance schedule for the components of a jet engine can prolong the service life and overall performance of the jet engine. Further, environmental data collected from locations where the jet engine is being operated can be used to determine an effective maintenance schedule that can prolong the service life and increase the overall performance of the jet engine. In addition, the effective maintenance schedule does not incur costs associated with maintenance schedules that do not take into account environmental data.

It has been determined that environmental data affects the failure rates in jet engines and components, industrial and airframe gas turbines and components and automobile engines and components. In this regard, as shown in FIG. 2 and presented in Table 1, temperature data collected at Sky Harbor Airport in Phoenix, Ariz. shows a normal monthly maximum daily temperature (degrees F.).

TABLE 1

| Jan | Feb | Mar | Apr | May | June | July | Aug | Sept | Oct | Nov | Dec |
|---|---|---|---|---|---|---|---|---|---|---|---|
| 64.0 | 68.1 | 75.0 | 83.9 | 92.9 | 101.6 | 104.6 | 101.6 | 98.2 | 86.7 | 73.7 | 66.1 |

Figure 2:
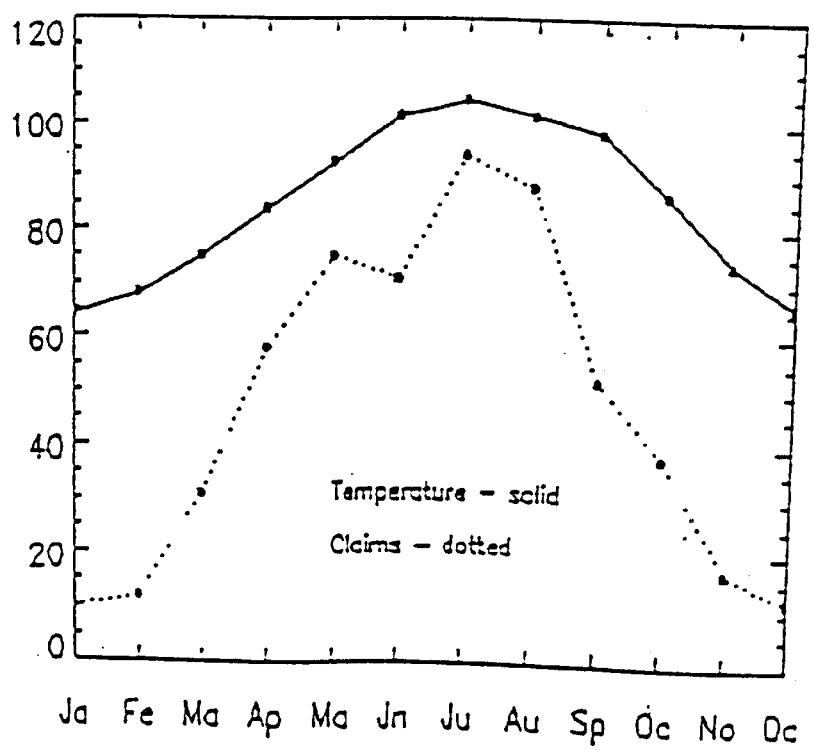
FIG. 2 is a plot of maximum daily temperature versus reported claims by month for an engine component.

In FIG. 2 and Table 2, repair claims data are shown for automobile components that are known to be especially sensitive to temperature and that have a relatively high cost of repair. In one embodiment, the automobile components comprise Interior Climate and Comfort (ICC) components including, for example, compressor, compressor mounting bracket, clutch and pulley, orifice tube, condenser, heater core, heater control valve, receiver/dryer, evaporator, air duct and outlets, accumulator, air conditioning (A/C) temperature control program, seals and gaskets. It is expected that the performance of these automobile components in various environmental conditions is similar to jet engine components that perform comparable functions to the automobile components.

TABLE 2

| Jan | Feb | Mar | Apr | May | June | July | Aug | Sept | Oct | Nov | Dec |
|---|---|---|---|---|---|---|---|---|---|---|---|
| 10 | 12 | 31 | 58 | 75 | 71 | 94 | 88 | 52 | 38 | 17 | 12 |

From FIG. 2, it is suggested that a dependency exists between repair claims and maximum daily temperature. In addition, a seasonality effect may exist for the repair claims. The dependency between the repair claims and the maximum daily temperature can be found by computing the linear correlation coefficient, $\rho$, using equation (1) the coefficient for two variables, x and y, can be determined.

$$\rho = \frac{\sum_i (x_i - \bar{x})(y_i - \bar{y})}{\sqrt{\sum_i (x_i - \bar{x})^2} \sqrt{\sum_i (y_i - \bar{y})^2}} \quad (1)$$

The linear correlation coefficient for the data in FIG. 2 is $\rho = 0.922$ that indicates a linear correlation between the repair claims and temperature. For perfect linear correlation, $\rho$ is unity or 1. It is found that $\rho$ computed for the data set $\{x_i, y_i\}$ will be invariant under the transformation shown in equation (2).

$$y \leftarrow ay + b \quad (2)$$

and, as such, a linear model that relates repair claims to normal monthly maximum daily temperature can be determined.

In determining the linear model, the Earth's seasonal path about the sun can be used to describe the normal monthly maximum daily temperature $T_i$, as a function of a sine wave, as shown in equation (3).

$$Ti = \frac{T\min + T\max}{2} - \frac{T\min - T\max}{2} \cos\left(2\pi \cdot \frac{i}{12}\right) \quad (3)$$

where in equation (3),
i is the month. For January, i=0; for December, i=11,
$T_i$ is the normal maximum daily temperature for the i-th month,
$T_{min}$ is the minimum of the normal maximum daily temperatures,
$T_{max}$ is the maximum of the normal maximum daily temperatures.

From the results displayed in FIG. 2, the linear relationship between repair claim rate and maximum daily temperature is modeled by equation (4) where $\hat{C}_i$ is the estimated number of claims in the i-th month and a and b are constants which will be a function of the state where the temperature measurements are taken.

$$\hat{C}_i = a + b\left[\frac{T\min + T\max}{2} - \frac{T\min - T\max}{2}\cos\left(2\pi \cdot \frac{i}{12}\right)\right] \quad (4)$$

A least squares fit of equation (4) is determined and the equations (5) are summarized as follows:

$$S_x = \sum_i T_i \quad (5)$$

$$S_y = \sum_i C_i$$

$$S_{xx} = \sum_i T_i^2$$

$$S_{xy} = \sum_i T_i C_i$$

$$\Delta = 12 S_{xx} - (S_x)^2$$

where the sums in equations (5) are taken over a 12 month period and where $C_i$ is the actual number of claims in the i-th month. From the equations (5), a and b is computed using equations (6).

$$a = \frac{S_{xx} S_y - S_x S_{xy}}{\Delta} \quad (6)$$

$$b = \frac{12 S_{xy} - S_x S_y}{\Delta}$$

Under the assumption of homoscedasticity using the least squares fit, it can be shown that $$S_y = 12a + bS_x \qquad (7)$$

and from equation (7), the model (4) is kept to a single parameter since "a" can be written as a function of "b" or vice-versa.

From the data in Tables 1 and 2 and shown in FIG. 2, the model in equation (4) for Arizona claim data results in the following:

$$a = -119.894$$

$$b = 1.97383$$

The coefficient of determination, "$R^2$", is calculated using equation (8) to determine the accuracy of the linear fit of the model in equation (4).

$$R^2 = \frac{\sum_i (\hat{C}_i - \overline{C})^2}{\sum_i (C_i - \overline{C})^2} \qquad (8)$$

Figure 3:
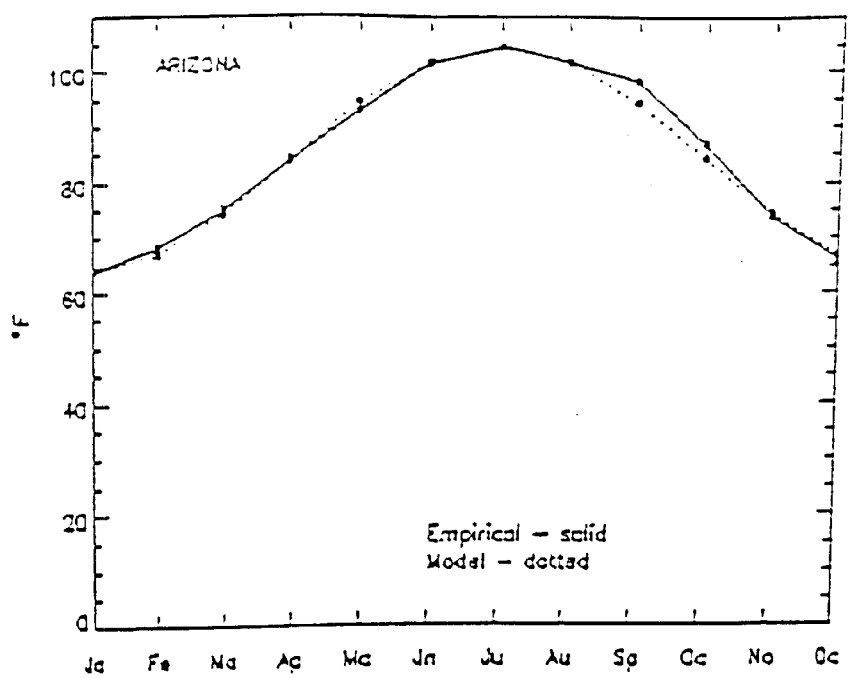
FIG. 3 is a plot of modeled and measured maximum daily temperature versus month.
Figure 4:
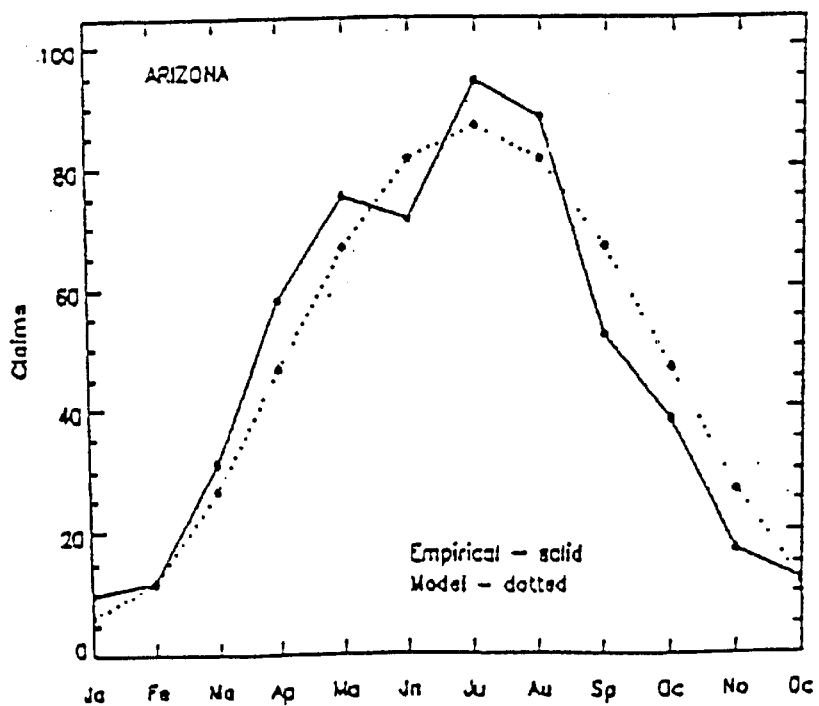
FIG. 4 is a plot of modeled and measured reported claims versus month.

For the data in Tables 1–2 and as shown in FIG. 2, $R^2 = 0.922$ that correlates to an accurate fit since in perfect fit $R^2$ equal to unity. Further, in FIG. 3, the temperature model using equation (4) is shown compared to the measured maximum daily temperature. In FIG. 4, the repair claims model using equation (4) is shown compared to the measured repair claims. As shown in FIGS. 3 and 4, equation (4) can be used to accurately model the maximum daily temperature and the repair claims for a jet engine component. Modeling the environmental data and the repair characteristics of various jet engine components similar to equation (4) allows a maintenance schedule to be determined for a jet engine based on the environmental data.

In addition, air borne contaminants can also affect jet engine performance and cause deterioration or erosion of various jet engine components. Typically, in a jet engine, erosion occurs on airfoil surfaces and affects several areas, such as, for example, increases in surface roughness, blade tip clearances and seal clearances and changes in inlet metal angle, airfoil throat opening. Erosion also affects the quality of the blading and axial compressors of the jet engine. The erosion to the airfoil and other components causes the jet engine to operate at a decreased operational efficiency. Air borne contaminants can include for example, hard particles that cause erosion and fouling, such as, dust, dirt, sand, rust, ash and carbon particles. In addition, air borne contaminants can include, for example, soft particles that cause fouling, such as, oil, unburned hydrocarbons, soot, air-borne industrial chemicals, fertilizers, herbicides, insecticides, pollen, plant spores, air-borne insects and air-borne salts.

Typically, about 80 percent of air borne particulate contaminants are below 2 $\mu$m in diameter. However, it has been determined that air borne particulates having a diameter of 20 $\mu$m ($\mu$) or more cause the most erosion to jet engine components. Various models have been developed to predict the concentration (dust mixing ratio) of many air borne particulates having various diameters, such as, for example, $\approx \frac{1}{2}\mu$ (e.g., clay); $1\mu$–$10\mu$ (e.g., fine silt); $10\mu$–$25\mu$ (e.g., coarse silt); $25\mu$–$50\mu$ (e.g., sand). The modeled concentration is the mass of the dust divided by the mass of the air for the air borne particulates as a function of geographical latitude and longitude, elevation, and month of the year. Other models incorporate environmental data gathered from satellite observations to produce a model of the dust mixing ratio. Therefore, the use of these air borne particulate models can be used to determine a maintenance schedule for a jet engine to increase the performance and service life of the jet engine.

Figure 6:
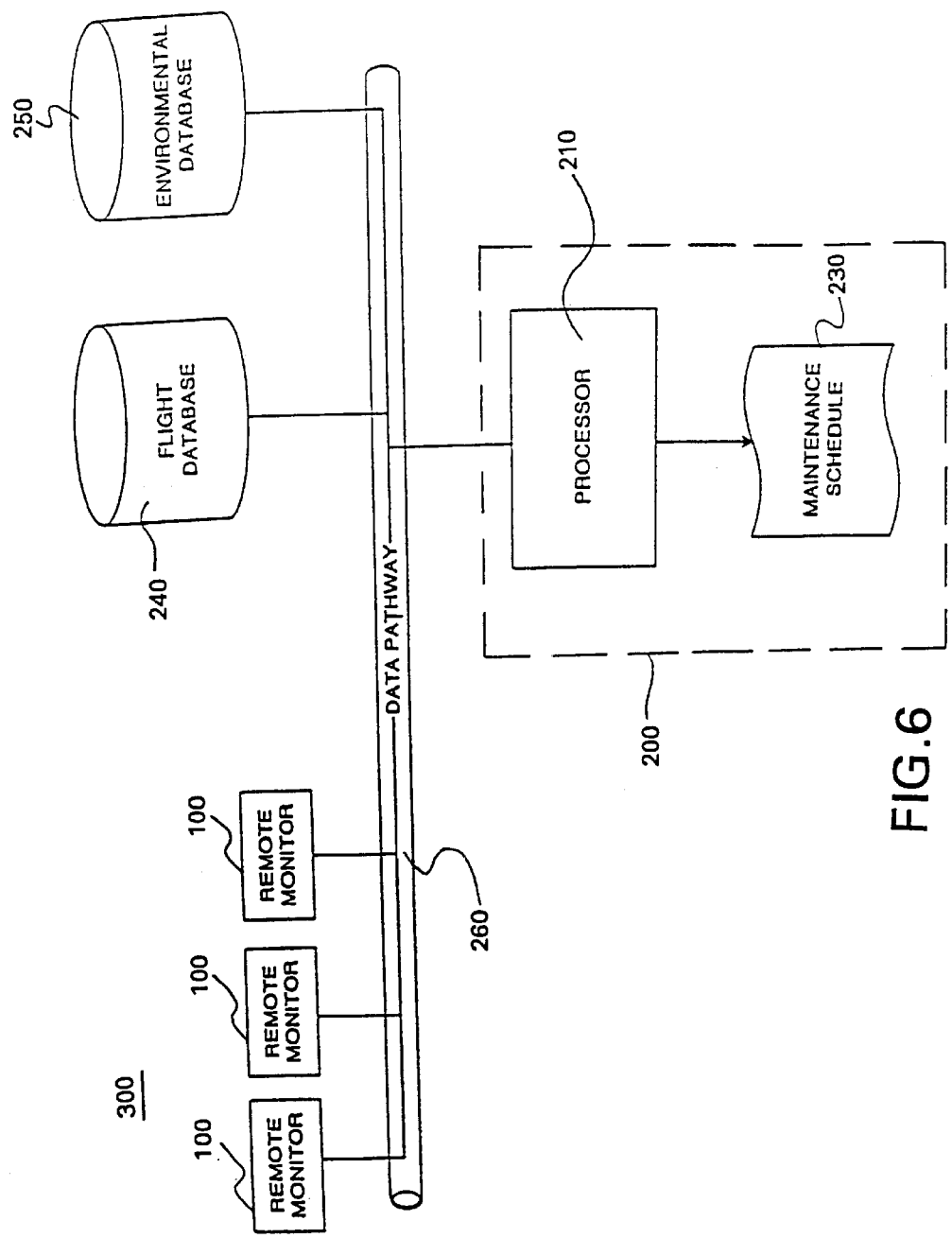
FIG. 6 is one exemplary embodiment a system for determining a maintenance schedule for a jet engine using environmental data.
Figure 7:
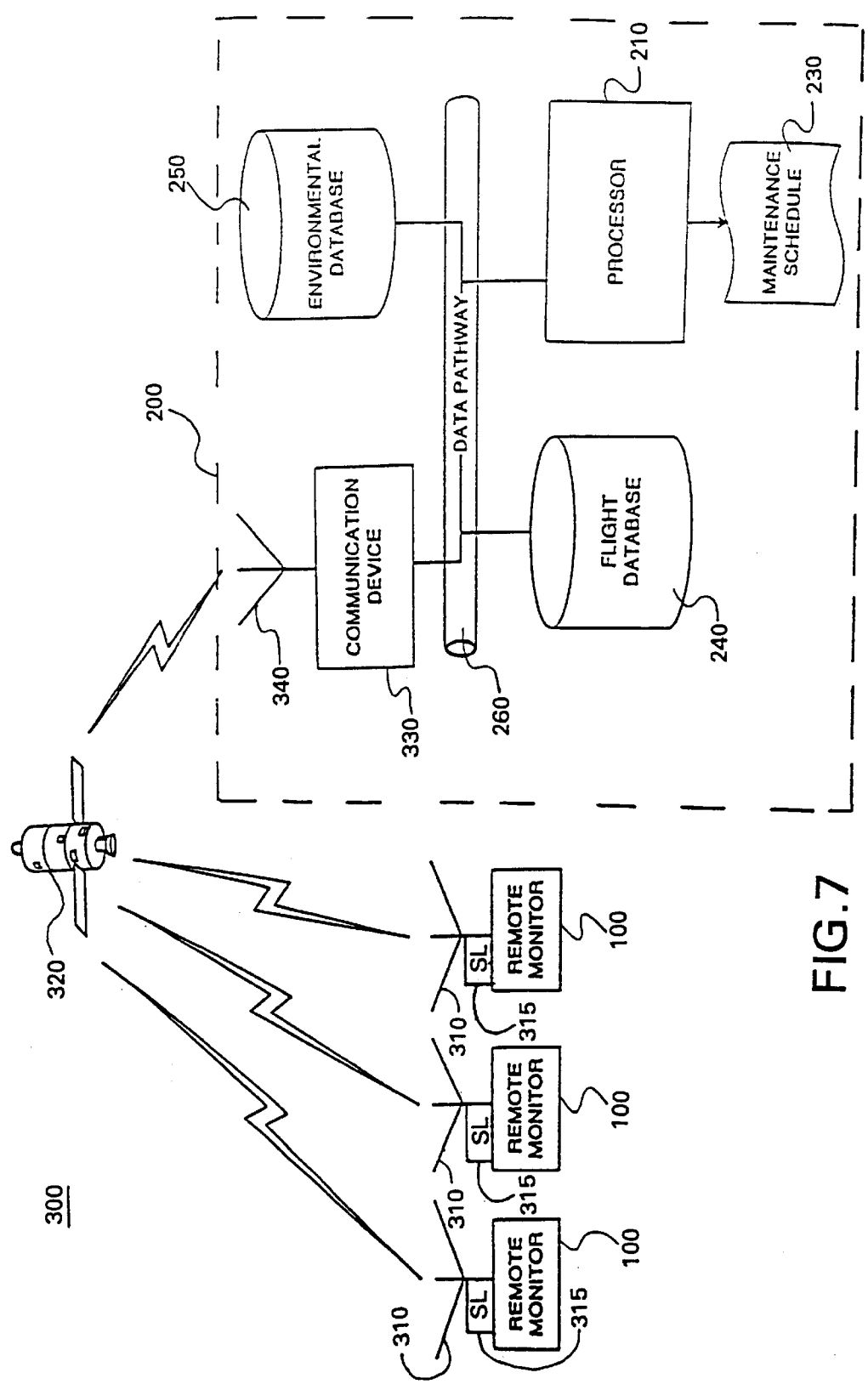
FIG. 7 is another exemplary embodiment a system for determining a maintenance schedule for a jet engine using environmental data.

Even though it may be possible to approximate many environmental conditions, it is believed that environmental data at locations proximate to where the jet engine is being used (locations of take-off and landing) will produce an accurate maintenance schedule for the jet engine. In this regard, as shown, in FIG. 5, a remote monitor 100 is provided to measure and gather specific environmental data and to report the remotely gathered environmental data to a processing location 200 (FIGS. 6 and 7). As such, it should be appreciated that a maintenance schedule system 300 (FIGS. 6 and 7) can comprise a plurality of remote monitors 100. The remote monitors 100 can be located proximate to or at various airports throughout the United States and/or other airports worldwide.

Figure 5:
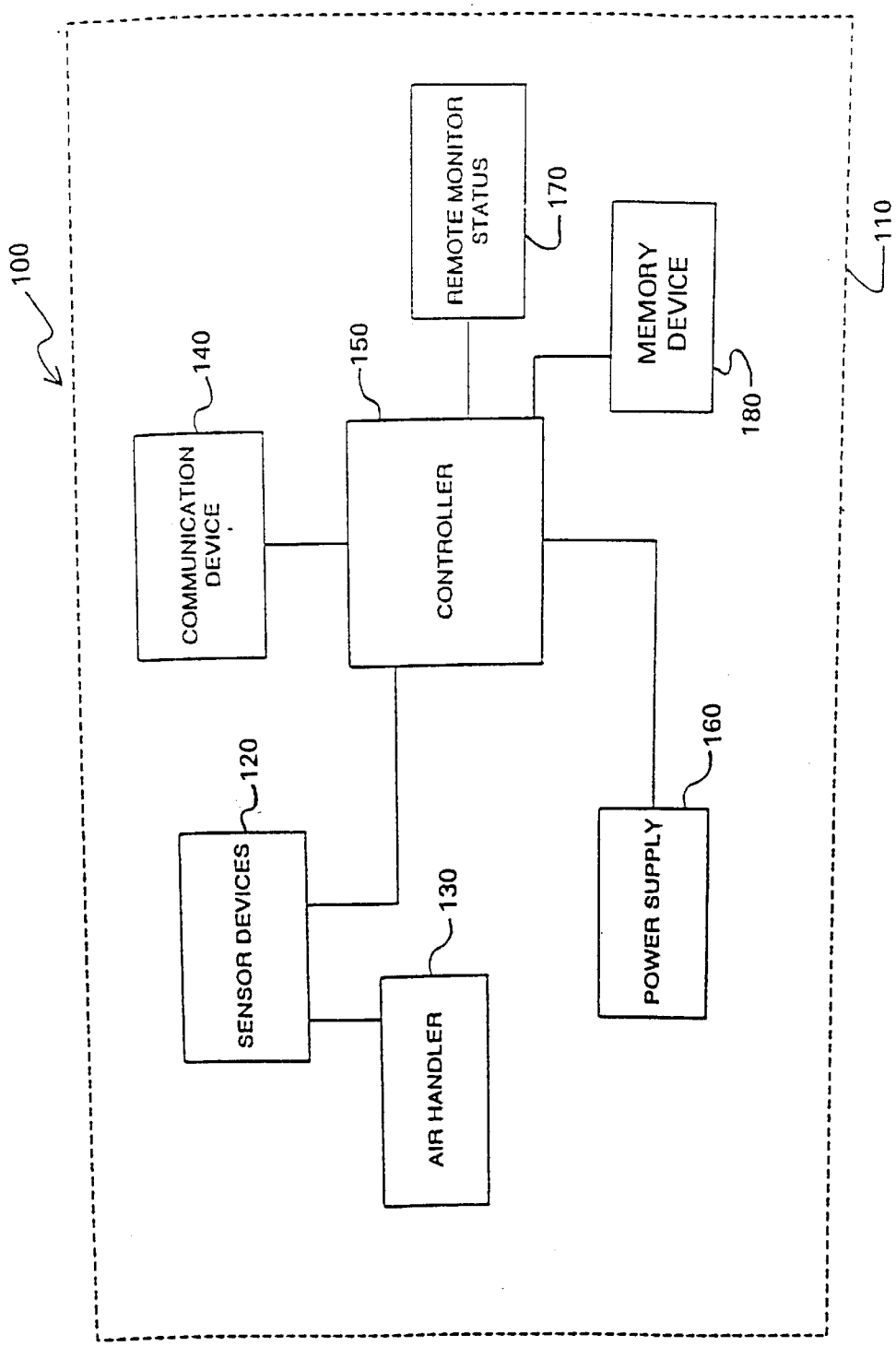
FIG. 5 is one exemplary embodiment of a remote monitor.

In one embodiment, as shown in FIG. 5, the remote monitor 100 includes a controller 150 enclosed in housing 110. In one embodiment, the housing 110 is sufficiently rugged to withstand wind, rain, sun and other weather phenomena. The controller 150 is connected to sensor devices 120 that include sensors used to measure, for example, relative humidity, air temperature, barometric pressure, the pH of the precipitation. In addition, in one embodiment, an air handler 130 is connected to the sensor device 120 to collect air samples such that air borne particulates can be measured. In another embodiment, the controller 150 is connected to a memory device 180 that stores the remotely-gathered environmental data. It should be appreciated that the memory device 180 can comprise, for example, random access memory, static random access memory, dynamic random access memory or a magnetic media.

The controller 150 is also connected to a remote monitor status device 170 that constantly or periodically measures the health of the remote monitor 100. In addition, the controller 150 is also connected to a power supply 160 to provide power the remote monitor 100. In one embodiment, the power supply 160 comprises a battery. In another embodiment, the power supply 160 comprises a direct connection to a power line. In even another embodiment, the power supply comprises a solar energy module.

As described above, the remote monitor 100 is capable of storing environmental data using the memory device 180 and transmitting the environmental data to a processing location 200 (FIGS. 6 and 7) using a communication device 140 that is connected to the controller 150. It should be appreciated that the communication device 140 can transmit the environmental data in a number of ways. In one embodiment, as shown in FIG. 6, the communication device 140 comprises a data pathway 260. In this embodiment of the maintenance schedule system 300, each remote monitor 100 is connected to the data pathway 260. A processor 210 located at the processing location 200 is also connected to the data pathway 260. A flight database 240 is connected to the data pathway 260 and an environmental database 250 is also connected to the data pathway 260. The processor 210 uses environmental data from the environmental database 250 and flight pattern data from the flight database 240 to produce a maintenance schedule 230 for the jet engine. The processor 210 can comprise, for example, a microprocessor, a computer, a server or other type of computing device. It should be appreciated that, in one embodiment, the flight database 240 and the environmental database 250 are located at a different location than the processing location 200. Also, it should be appreciated that, in another embodiment, the flight database 240 and the environmental database 250 are also located at the processing location 200. Also, in even another embodiment, the processing location 200 can be located at or within the remote monitor 100 wherein the processor 210 is located within the remote monitor 100. In yet another embodiment, the processing location 200 can include the processor 210, the flight database 240 and the environmental database 250 wherein these components are located at or within the remote monitor 100.

In the embodiment, shown in FIG. 6, the remote monitors 100 measure and collect environmental data and transmit the environmental data to the environmental database 250 via the data pathway 260. The environmental database 250 comprises a database that stores and categorizes environmental data based on the location where the environmental data is collected. Further, the flight database 240 receives and stores flight pattern information for at least one jet engine. In one embodiment, the flight pattern information comprises take off and landing locations of the jet engine along with thermal cycle data and time on wing data for the jet engine. As discussed herein above, the thermal cycle data refers to the number of times that the jet engine experience full heating and cooling such as during take off, climb, cruise, decent and landing. In addition, the time on wing data relates to the amount of time the jet engine is in the air. The processor 210 accesses the flight pattern data from the flight database 240 via the data pathway 260. Based on the flight pattern of the jet engine, the processor 210 accesses the environmental data from the environmental database 250. Using the environmental data and modeling the erosion and wear of the jet engine, the processor 210 produces a maintenance schedule 230 for the jet engine. The data pathway 260 can comprise, for example, a computer bus, a local area network (LAN), a wide area network (WAN), an extranet, or a global network, such as, the internet. The communication device 140 can also include a telephone or cable modem or a network card such as an Ethernet adapter, local area network (LAN) adapter, integrated services digital network (ISDN) adapter, or Digital Subscriber Line (DSL) adapter, that enables the remote monitor 100 to access other computers, processors 210 and resources on a network such as, for example, a private network such as an extranet or intranet or a global network such as a WAN (e.g., Internet).

In another embodiment, as shown in FIG. 7, the communications device 140 comprises a satellite relay 315 connected to an antenna 310. The satellite relay 315 and antenna 310 are used to transmit the remotely-gathered environmental data from the remote unit 100 to the processing location 200 by using a satellite 320. In this embodiment, as shown in FIG. 7, a communication device 330 is connected to an antenna 340 and a data pathway 260. In one embodiment, the communication device 330 comprises a satellite transmission receiver. Also, the data pathway 260 is connected to a flight database 240 and an environmental database 250. A processor 210 is also connected to the data pathway 260. The processor 210 can comprise, for example, a microprocessor, a computer, a server or other type of computing device. As described above in relation to FIG. 6, it should be appreciated that, in one embodiment, the flight database 240 and the environmental database 250 are located at a different location than the processing location 200. Also, it should be appreciated that, in another embodiment, the flight database 240 and the environmental database 250 are also located at the processing location 200.

In the embodiment of FIG. 7, the remote monitor 100 measures and collects the environmental data. The satellite relay 315 and antenna 310 are used to transmit the environmental data to the processing location 200 where the communication device 330 and the antenna 340 receive the environmental data. Once received, the environmental data is stored and categorized in the environmental database 250. The flight database 240 also receives flight pattern data relating to the jet engine. The processor 210 gathers flight pattern data from the flight database 240 relating to the jet engine. Using the flight pattern data, the processor 210 then retrieves environmental data from the environmental database 250. Using the environmental data, the processor 210 determines a maintenance schedule 230 that is based on modeling the wear and erosion of the jet engine from the environmental data along with the flight pattern data, such as, for example, thermal cycle data and time on wing data. It should be appreciated that the satellite 320 can comprise, for example, a geostationary (GEO) satellite, a medium Earth orbit (MEO) satellite or a low Earth orbit (LEO) satellite.

In another embodiment of FIG. 7, a satellite 320 is not used. The communications device 140 of the remote monitor 100 comprises a wireless transmitter that directly transmits the environmental data to the communications device 330. In this embodiment, the communications device 330 comprises a wireless transmission receiver. It should be appreciated that, in this embodiment, the wireless transmission can comprise, for example, spread spectrum transmission. In addition, it should also be appreciated that the wireless transmission can comprise a wireless local area network (LAN).

Figure 8:
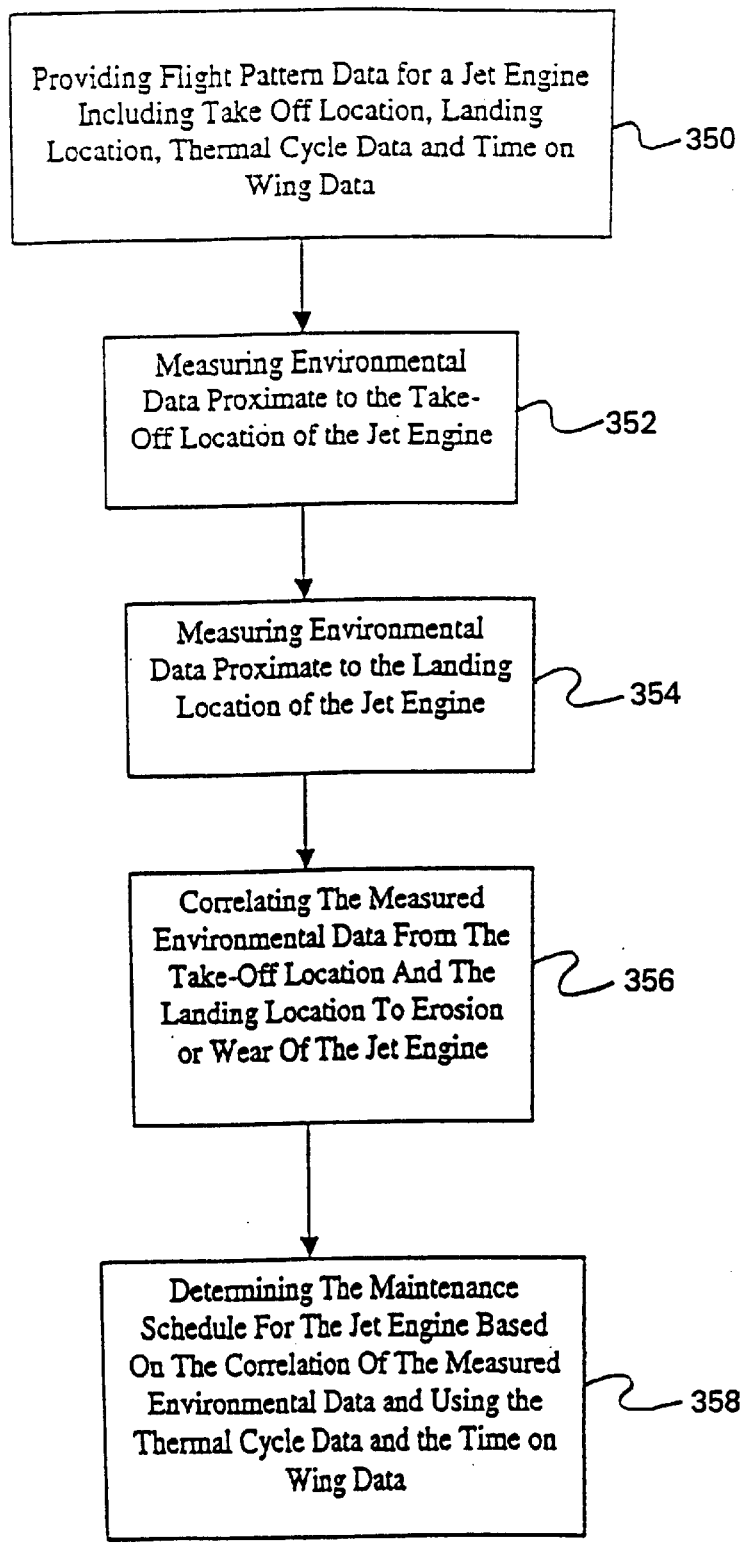
FIG. 8 is a flow diagram showing one exemplary embodiment of a method for determining a maintenance schedule for a jet engine using environmental data.

In FIG. 8, a method for determining a maintenance schedule 230 for a jet engine is provided. Using flight database 240 (FIGS. 6 and 7), the flight pattern data for the jet engine is provided (step 350). The flight pattern data includes various take-off and landing locations where the jet engine will travel or has traveled. In addition, the flight pattern data can also include thermal cycle data for the jet engine and time on wing data for the jet engine. Using some of the flight pattern data, environmental data is measured using the remote monitor 100 proximate to a take-off location of the jet engine (step 352). Also, environmental data proximate to a landing location of the jet engine is also collected and/or measured (step 354). In one embodiment, the environmental data is stored at the remote monitor 100 using a memory device 180 and later the environmental data is provided to an environmental database 250 that stores and categorizes the environmental data. It should be appreciated that measuring and collecting environmental data proximate to the take-off and landing locations comprises measuring environmental data at or near the take-off and landing location. In addition it should also be appreciated that the flight database 240 and the environmental database 250 can include all types of disk drives such as floppy disks, hard disks and optical disks, as well as tape drives that can read and write data onto a tape that could include digital audio tapes (DAT), digital linear tapes (DLT), or other magnetically coded media. In addition, it should also be appreciated that the flight database 240 and the environmental database 250 can include all types of electronic storage devices such as random access memory, static random access memory, dynamic random access memory or any other electronic storage device. Also, the flight database 240 can receive flight pattern data from various sources, such as, airports or airlines, and categorizes the flight pattern data (take-off location, landing location, thermal cycle data, and time on wing data) for one or many jet engines. In addition, the environmental database 250 categorizes environmental data based on various take-off and landing locations. As such, the environmental data can be categorized for a specific landing location over a number of seconds, minutes, hours, days, weeks, months or years.

In addition, as shown in FIG. 8, once the environmental data has been measured, the measured, remotely-gathered environmental data is correlated based on various models of the erosion and wear of the jet engine (step 356). After the correlation of the measured, remotely-gathered environmental data is correlated, a maintenance schedule 230 is determined from the correlation (step 358) and using the thermal cycle data and the time on wing data. In one embodiment, a processor 210 performs the correlation of the environmental data (step 356) and the determination of the maintenance schedule 230 (step 358). It should be appreciated that the steps the correlation of the environmental data (step 356) and the determination of the maintenance schedule 230 (step 358) can be embodied in any computer-readable medium for use by or in connection with a processor 210 or computer system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). It is even possible to use paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

As such, all "cycles" of a jet engine are not created equal and various conditions relating to each cycle affects the wear introduced to the jet engine. These conditions include such things as engine derate and environmental data. Therefore, the maintenance schedule 230 for the jet engine is produced using at least the environmental data to accurately reflect the erosion and wear introduced to the jet engine based on the environmental data. Thus, a more cost efficient maintenance schedule 230 is used to determine Maintenance Cost Per Hour (MCPH) fleet management or servicing.

The foregoing discussion of the invention has been presented for purposes of illustration and description. Further, the description is not intended to limit the invention to the form disclosed herein. Consequently, variations and modifications commensurate with the above teachings and with the skill and knowledge of the relevant art are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method of determining a maintenance schedule for a jet engine, the method comprising the steps of:

provided flight pattern data for the jet engine, the flight pattern data comprising a take-off location for the jet engine, a landing location for the jet engine, thermal cycle data for the jet engine and time on wing data for the jet engine;

measuring environmental data proximate to the take-off location for the jet engine;

measuring environmental data proximate to the landing location for the jet engine;

correlating the measured environmental data from the take-off location and the landing location to wear of the jet engine; and determining the maintenance schedule for the jet engine based upon the step of correlating and using the thermal cycle data and the time on wing data.

2. The method of claim 1 wherein the step of measuring environmental data proximate to the take-off location comprises measuring ambient air temperature at the take-off location and the step of measuring environmental data proximate to the landing location comprises measuring ambient air temperature at the landing location.

3. The method of claim 1 wherein the step of measuring environmental data proximate to the take-off location comprises measuring barometric pressure at the take-off location and the step of measuring environmental data proximate to the landing location comprises measuring barometric pressure at the landing location.

4. The method of claim 1 wherein the step of measuring environmental data proximate to the take-off location comprises measuring relative humidity at the take-off location and the step of measuring environmental data proximate to the landing location comprises measuring relative humidity at the landing location.

5. The method of claim 1 wherein the step of measuring environmental data proximate to the take-off location comprises determining air borne particulates at the take-off location and the step of measuring environmental data proximate to the landing location comprises determining air borne particulates at the landing location.

6. The method of claim 1 wherein the step of measuring environmental data proximate to the take-off location comprises measuring pH of precipitation at the take-off location and the step of measuring environmental data proximate to the landing location comprises measuring pH of precipitation at the landing location.

7. The method of claim 1 further comprising the step of transmitting the measured environmental data to a remote location wherein at least the steps of correlating and determining occur at the remote location.

8. The method of claim 7 wherein the step of transmitting the environmental data comprises communicating with a geostationary satellite.

9. The method of claim 7 wherein the step of transmitting the measured environmental data comprises communicating with a low earth orbit satellite.

10. The method of claim 7 wherein the step of transmitting the measured environmental data comprises communicating over a local area network (LAN).

11. The method of claim 7 wherein the step of transmitting the measured environmental data comprises communicating over an intranet.

12. The method of claim 7 wherein the step of transmitting the measured environmental data comprises communicating over a wide area network (WAN).

13. The method of claim 7 wherein the step of transmitting the measured environmental data comprises communicating over the internet.

14. A method for determining a maintenance schedule for a jet engine, the method comprising the steps of:
proving flight pattern data relating to the jet engine, the flight pattern data comprising a take-off location, a landing location of the jet engine, thermal cycle data and time on wing data;
measuring environmental data proximate to the take-off location;
archiving the measured environmental data from the take-off location;
measuring environmental data proximate to the landing location;
archiving the measured environmental data from the landing location;
correlating the archived environmental data from the take-off location and the landing location to wear of the jet engine;
determining the maintenance schedule of the jet engine based on the step of correlating and using the thermal cycle data and the time on wing data.

15. The method of claim 14 wherein the step of measuring environmental data proximate to the take-off location comprises measuring ambient air temperature at the take-off location and the step of measuring environmental data proximate to the landing location comprises measuring ambient air temperature at the landing location.

16. The method of claim 14 wherein the step of measuring environmental data proximate to the take-off location comprises measuring barometric pressure at the take-off location and the step of measuring environmental data proximate to the landing location comprises measuring barometric pressure at the landing location.

17. The method of claim 14 wherein the step of measuring environmental data proximate to the take-off location comprises measuring relative humidity at the take-off location and the step of measuring environmental data proximate to the landing location comprises measuring relative humidity at the landing location.

18. The method of claim 14 wherein the step of measuring environmental data proximate to the take-off location comprises determining air borne particulates at the take-off location and the step of measuring environmental data proximate to the landing location comprises determining air borne particulates at the landing location.

19. The method of claim 14 wherein the step of measuring environmental data proximate to the take-off location comprises measuring pH of precipitation at the take-off location and the step of measuring environmental data proximate to the landing location comprises measuring pH of precipitation at the landing location.

20. The method of claim 14 further comprising the step of transmitting the measured environmental data to a remote location wherein at least the steps of archiving, correlating and determining occur at the remote location.

21. The method of claim 20 wherein the step of transmitting the environmental data comprises communicating with a geostationary satellite.

22. The method of claim 20 wherein the step of transmitting the measured environmental data comprises communicating with a low earth orbit satellite.

23. The method of claim 20 wherein the step of transmitting the measured environmental data comprises communicating with a medium earth orbit satellite.

24. The method of claim 20 wherein the step of transmitting the measured environmental data comprises communicating over a local area network (LAN).

25. The method of claim 20 wherein the step of transmitting the measured environmental data comprises communicating over an intranet.

26. The method of claim 20 wherein the step of transmitting the measured environmental data comprises communicating over a wide area network (WAN).

27. The method of claim 20 wherein the step of transmitting the measured environmental data comprises communicating over the internet.

28. A system for determining a maintenance schedule for a jet engine using at least remotely-gathered environmental data, the system comprising:
a remote monitor for collecting and transmitting the remotely-gathered environmental data, the remote monitor comprising:
at least one sensor for measuring the remotely-gathered environmental data;
a controller connected to the at least one sensor; and
a remote communications device connected to the controller for transmitting the remotely-gathered data;
a processing unit for receiving the remotely-gathered data from the remote monitor and determining the maintenance schedule for the jet engine, the processing unit comprising:
a processor communications device for receiving the remotely-gathered data transmitted from the remote monitor;
a processor connected to the processor communications device for processing the remotely-gathered environmental data;
an environmental database connected to the processor for compiling and storing the remotely-gathered environmental data; and
a flight database connected to the processor for compiling and storing flight data for the jet engine wherein the flight data includes at least thermal cycle data and time on wing data,
wherein the processor is adapted to generate the maintenance schedule for the jet engine based on the remotely-gathered environmental data and the flight data.

29. The system of claim 28 wherein the remote monitor further comprises an air handler connected to the at least one sensor for sampling ambient air.

30. The system of claim 29 wherein the at least one sensor comprises a sensor connected to the air handler for analyzing airborne particulates in the sampled air.

31. The system of claim 28 wherein the at least one sensor comprises precipitation collector and a sensor connected to the precipitation collector for measuring pH of the collected precipitation.

32. The system of claim 28 wherein the at least one sensor comprises a barometer for measuring atmospheric pressure.

33. The system of claim 28 wherein the at least one sensor comprises a temperature sensor for measuring ambient temperature.

34. The system of claim 28 wherein the at least one sensor comprises a sensor for measuring relative humidity.

35. The system of claim 28 wherein the remote communications device comprises a low earth orbit satellite relay and the processor communications device (330) comprises a low earth orbit satellite receiver.

36. The system of claim 35 wherein the remote communications device further comprises an antenna connected to the low earth orbit satellite relay and the processor communications device further comprises an antenna connected to the low earth orbit satellite receiver.

37. The system of claim 28 wherein the remote communications device comprises a geostationary satellite relay and the processor communications device comprises a geostationary satellite receiver.

38. The system of claim 37 wherein the remote communications device further comprises an antenna connected to the geostationary satellite relay and the processor communications device further comprises an antenna connected to the geostationary satellite receiver.

39. The system of claim 28 wherein the remote communications device comprises a medium earth orbit satellite relay and the processor communications device comprises a medium earth orbit satellite receiver.

40. The system of claim 39 wherein the remote communications device further comprises an antenna connected to the medium earth orbit satellite relay and the processor communications device further comprises an antenna connected to the medium earth orbit satellite receiver.

41. The system of claim 28 wherein the remote monitor further comprises a remote monitor status device connected to the controller and monitoring the status of the remote monitor.

42. The system of claim 28 wherein the remote monitor further comprises a power supply connected to the controller for supplying power to the remote monitor.

43. The system of claim 28 wherein the remote monitor further comprises a memory device connected to the controller for storing the remotely-gathered environmental data.

44. A system for determining a maintenance schedule for a jet engine using at least remotely-gathered environmental data, the system comprising:

a remote monitor comprising at least one sensor for collecting the remotely-gathered environmental data;

a data pathway connected to the remote monitor;

a processor connected to the data pathway for processing the remotely-gathered environmental data collected by the remote monitor;

an environmental database connected to the data pathway for compiling and storing the remotely-gathered environmental data; and a flight database connected to the data pathway for compiling and storing flight data for the jet engine, the flight data including at least thermal cycle data and time on wing data, wherein the processor is adapted to generate the maintenance schedule for the jet engine based on the remotely-gathered environmental data and the flight data.

45. The system of claim 44 wherein the remote monitor further comprises an air handler connected to the at least one sensor for sampling ambient air.

46. The system of claim 45 wherein the at least one sensor comprises a sensor connected to the air handler for analyzing airborne particulates in the sampled air.

47. The system of claim 44 wherein the at least one sensor comprises precipitation collector and a sensor connected to the precipitation collector for measuring pH of the collected precipitation.

48. The system of claim 44 wherein the at least one sensor comprises a barometer for measuring atmospheric pressure.

49. The system of claim 44 wherein the at least one sensor comprises a temperature sensor for measuring ambient temperature.

50. The system of claim 44 wherein the at least one sensor comprises a sensor for measuring relative humidity.

51. The system of claim 44 wherein the data pathway comprises a local area network (LAN).

52. The system of claim 44 wherein the data pathway comprises an intranet.

53. The system of claim 44 wherein the data pathway comprises a wide area network (WAN).

54. The system of claim 44 wherein the data pathway comprises the internet.

55. The system of claim 44 wherein the remote monitor further comprises a remote monitor status device connected to the controller and monitoring the status of the remote monitor.

56. The system of claim 44 wherein the remote monitor further comprises a power supply connected to the controller for supplying power to the remote monitor.

57. The system of claim 44 wherein the remote monitor further comprises a memory device connected to the controller for storing the remotely gathered environmental data.

* * * * *